United States Patent [19]

Smed

[11] Patent Number: 5,042,769

[45] Date of Patent: Aug. 27, 1991

[54] ADJUSTABLE CLIP FOR HANGING FILE HOLDER SYSTEMS

[76] Inventor: Ole E. Smed, 32940 Woodland Dr., Evergreen, Colo. 80439

[21] Appl. No.: 561,936

[22] Filed: Aug. 2, 1990

[51] Int. Cl.$^5$ ............................................. A47B 96/00
[52] U.S. Cl. .................................. 248/231.8; 248/230
[58] Field of Search .................. 248/231.8, 230, 231.7, 248/316.1, 316.7; 24/265 EC, 265 H, 457; 211/46, 189; 403/235, 237, 191, 74, 57; 312/184; D19/90

[56] References Cited

U.S. PATENT DOCUMENTS

| | | | |
|---|---|---|---|
| 3,194,526 | 7/1965 | Lemmond | 248/230 X |
| 4,577,374 | 3/1986 | Lil | 24/265 H |
| 4,605,190 | 8/1986 | Kamp | 248/231.8 X |
| 4,907,769 | 3/1990 | Hunley, Jr. et al. | 248/316.7 X |
| 4,921,199 | 5/1990 | Villaveces | 248/316.7 X |

FOREIGN PATENT DOCUMENTS 109274 12/1980 Canada .............................. 248/231.8

Primary Examiner—Ramon O. Ramirez
Attorney, Agent, or Firm—Bailey & Hardaway

[57] ABSTRACT

A device for providing an adjustable hanging file holder frame which is adaptable to a variety of existing office and desk organizing systems. In the preferred form of the invention, resilient, flexible clips are used to attach support rods to existing office or desk organization systems. The support rods provide the frame or rail upon which hanging files may be placed. The support rods are reversibly attached to the resilient clip members by a coupling head. The coupling head is configured to allow its forcible insertion into a mated receptacle within the clip member. When the support rod coupling head is within the receptacle, the clip mechanism is free to rotate about the support rod. The clip permits a variety of different shaped objects to be secured, providing a versatile, adaptable means of providing a hanging file folder frame.

5 Claims, 2 Drawing Sheets

ADJUSTABLE CLIP FOR HANGING FILE HOLDER SYSTEMS

BACKGROUND OF THE INVENTION

This invention relates to the art of filing systems and more particularly to the art of providing an adjustable hanging file holder which is clip-adaptable to numerous desk organizing systems.

Hanging file holders are well known in the business community and have proven popular as an office desk drawer accessory. Unfortunately, there is little uniformity in desk drawer dimensions among the plethora of different office furniture offerings. As such, traditional desk drawer organizers and hanging file holder arrangements are of limited utility in an office or organization which houses numerous styles of furniture of varying dimensions.

As a consequence, many organizing systems exist on the market of varying sizes, dimensions and capabilities. To date there has been no effective way to provide a hanging file holder frame which would readily interface with existing desk organizing systems. Therefore, much room for improvement in the art exists.

SUMMARY OF THE INVENTION

It is thus an object of this invention to provide a novel hanging file folder system.

It is a further and more particular object of this invention to provide a clip member which can be connected to a variety of existing desk organizing systems to provide a frame for a hanging file holder system.

It is a further object of this invention to provide a mated means of reversibly mounting the clip member upon a support rod.

It is a still further object of this invention to provide a secure means of mounting the clip to a support rod which enables the clip to rotate freely while mounted upon the support rod.

These as well as other objects of the invention are accomplished by a flexible and resilient clip member, detachable from a mated support rod, which can be interconnected to a variety of existing desk organizing systems to provide an adjustable framework for a hanging file holder system.

DETAILED DESCRIPTION

In accordance with this invention, it has been found that the flexible clip of the present invention can be utilized with a variety of existing desk organizing systems to provide an adjustable hanging file folder frame. Furthermore, the invention provides a strong yet detachable and resilient means for securing the clip to a mated support rod while still enabling the clip to be rotatable.

Figure 1:
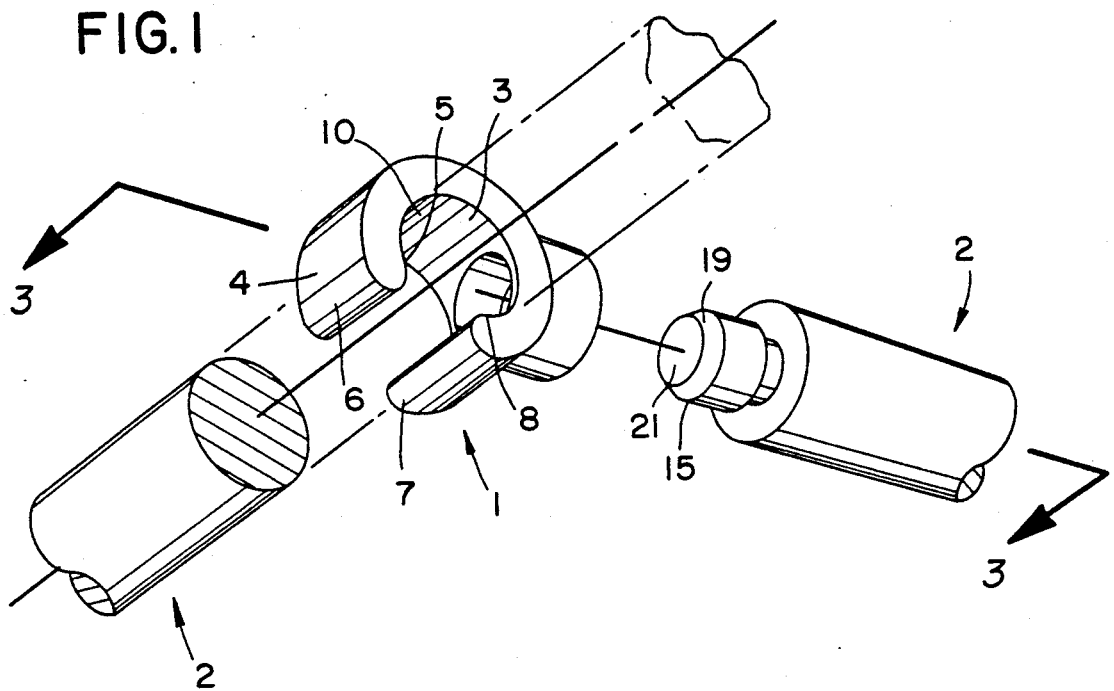
FIG. 1 is a perspective view of the clip member, shown detached from the carrying support rod, and with the partial cylinder engaging an object seen in partial phantom view.

FIG. 1 of the drawings shows the arcuate clasping clip member 1 detached from a support rod 2, with clip 1 further carrying an engaging object 14 as seen in partial phantom view. In the preferred embodiment, the clasping clip member 1 is constructed of a flexible, resilient material such as polyamide. Other resilient materials will be operable. The clip has an inner grasping surface 3 and an outer surface 4 which define a partial cylinder 10. The inner grasping surface 3 has a lesser radius than the radius of outer surface 4 of the clip. The inner surface 3 and outer surface 4 terminate at a first and a second free end, 6 and 7 respectively. An abutting protrusion extends from end 6 and forms clasping lip 5. Similarly, a second abutting protrusion extends from end 7 and forms clasping lip 8.

Figure 3:
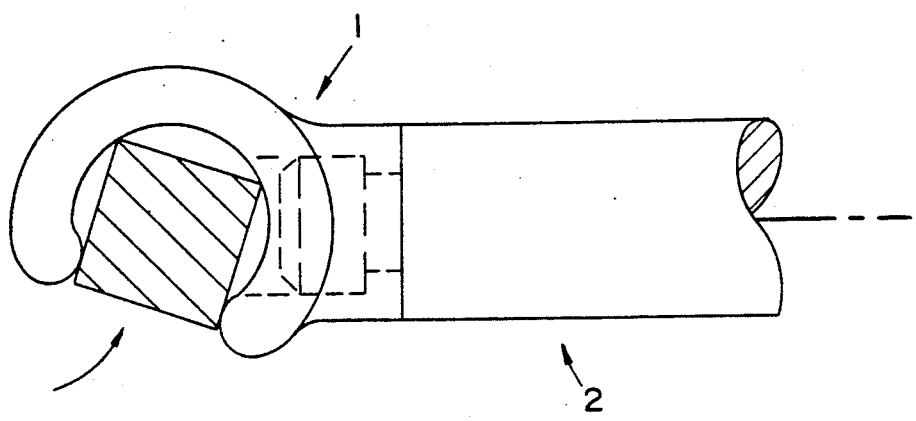
FIGS. 3 through 5 are elevational views in partial section of various sized engaging objects carried by the clip member.
Figure 4:
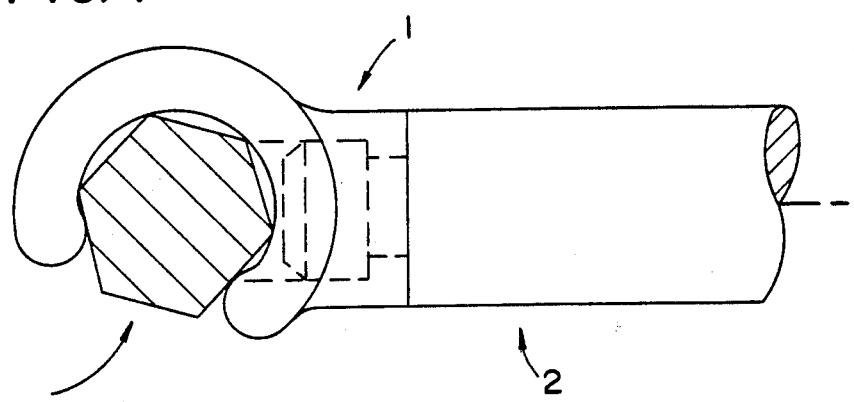
Figure 5:
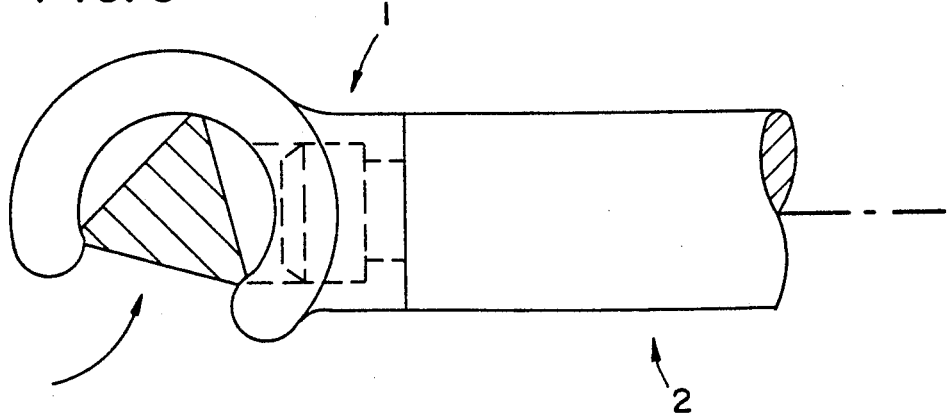

Lips 5 and 8 are arranged so as to oppose one another. This arrangement enables the resilient lips 5 and 8 to secure a wide variety of differently sized and shaped objects. As seen in FIGS. 3 through 5, round, triangular, rectangular, and various polygonal-sided objects of varying effective diameters may be secured within the partial cylinder 10 by the resilient lips 5 and 8.

Figure 2:
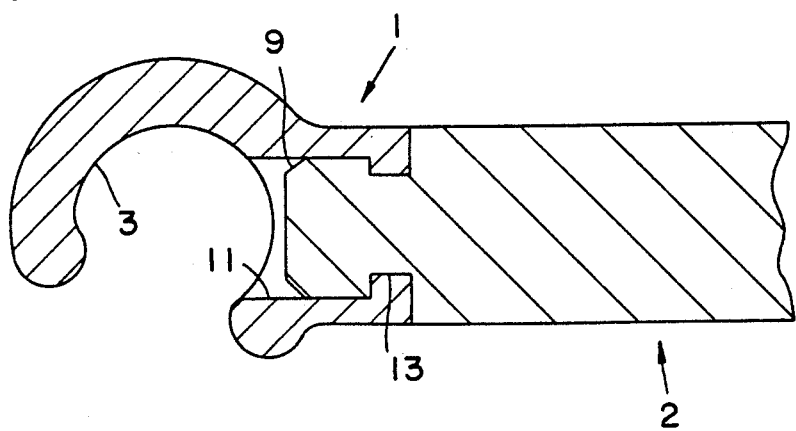
FIG. 2 of the drawings is a longitudinal cross section of the clip member apparatus as taken along line 3—3 of FIG. 1.

FIG. 2 illustrates a resilient cylindrical receptacle 9 defined by the clasping member. Receptacle 9 traverses the clasping member, originating at the inner grasping surface 3 of the clip. The receptacle 9 is shown with a larger diameter bore 11 which is reduced to a smaller diameter inner bore 13 distal from the inner grasping surface 3.

The receptacle 9 is designed to accommodate the coupling head 15, seen in FIG. 1. The coupling head 15 is a smaller diameter extension of the support rod 2 carried by a circumferential groove 17. The terminal portion of the coupling head 15 has a tapering surface 19, distal from said carrying rod, terminating with a flat head 21. The overall arrangement permits coupling head's 15 smaller diameter extension to be forcibly inserted into the receptacle 9, providing the attachment means for mating the clip member 1 to the support rod 2. The mated structure allows rotation of the clip member 1 about the support rod 2 but inhibits the detachment of the clip. In the preferred embodiment seen in FIG. 2, the boundary 22 between the clip 1 and the support rod 2 is flush while the flat head 21 remains recessed below the clasping surface 3.

Thus, when both ends of the support rod are mated to a clasping member, the clasping members may be attached to appropriately sized objects, thereby forming a frame for hanging files where the support rods serve as attachment rails for the files.

It is thus seen that this invention provides a means for attaching support rods to existing desk drawer organizing systems to provide a frame for a hanging file holder. As many variations will become apparent from a reading of the above disclosure, which is exemplary in nature, such variations are included within the spirit and scope of this invention as defined by the following appended claims.

That which is claimed is:

1. A resilient, flexible clip and an attaching support rod for use with an existing desk drawer organizing system to provide a hanging file holder for an adjustable filing system comprising:
   an arcuate clasping clip member defining a partial cylinder, having an inner grasping surface and an outer surface, said inner surface having a radius less than the radius of said outer surface;

said arcuate member with a first and a second free end that abut inwardly, forming two opposing clasping lips at either terminus of said inner grasping surface;

said inner grasping surface of said arcuate member being capable of securely grasping objects of various sizes and shapes;

attachment means for carrying said clasping member, by means reversible, on a support rod; and, a resilient cylindrical receptacle, defined by said arcuate member, transverse to said inner grasping surface, and said resilient cylindrical receptacle having a larger diameter bore in communication with said inner grasping surface, and said receptacle tapering to a reduced diameter inner bore distal from said inner grasping surface.

2. The apparatus as recited in claim 1 wherein said attachment means comprises:

a coupling head carried at either tip of said support rod providing means for mating with said receptacle, said coupling head being a reduced diameter extension of said support rod and being carried by a circumferential groove;

said coupling head, distal from said carrying rod tapering into a flat head.

3. The apparatus as recited in claim 1 wherein said arcuate clasping member is constructed of polyamide.

4. The apparatus as recited in claim wherein said attachment means is adopted to allow the arcuate clasping member to rotate upon said support rod.

5. A method for providing an adjustable file holder frame comprising the steps of:

providing a resilient, flexible clip and an attaching support rod for use with an existing desk drawer organizing system to provide a hanging file holder for an adjustable filing system comprising:

a flexible clip, a receptacle, defined by said clip, a support rod, having a first and a second end, engaging means carried at said first and said second end of said support rod;

engaging said support rod into said receptacle of said clip;

attaching said clip, carrying said support rod, to said framework of said desk organizing system;

wherein said support rod provides an adjustable frame for hanging files.

* * * * *